US008836161B2

(12) United States Patent
Nogi et al.

(10) Patent No.: US 8,836,161 B2
(45) Date of Patent: Sep. 16, 2014

(54) ROLLING STOCK SYSTEM AND CONTROL METHOD THEREOF

(75) Inventors: Masayuki Nogi, Hachioji (JP);
Katsuhisa Inagaki, Higashiyamoto (JP);
Kazuaki Yuuki, Tokorozawa (JP);
Yosuke Nakazawa, Kunitachi (JP);
Satoshi Koizumi, Matsudo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 590 days.

(21) Appl. No.: 13/256,391

(22) PCT Filed: Mar. 12, 2010

(86) PCT No.: PCT/JP2010/001805
§ 371 (c)(1),
(2), (4) Date: Sep. 13, 2011

(87) PCT Pub. No.: WO2010/103859
PCT Pub. Date: Sep. 16, 2010

(65) Prior Publication Data
US 2012/0000739 A1    Jan. 5, 2012

(30) Foreign Application Priority Data

Mar. 13, 2009  (JP) ................................ 2009-061387
Mar. 13, 2009  (JP) ................................ 2009-061389

(51) Int. Cl.
| B60L 1/00 | (2006.01) |
| B60L 3/00 | (2006.01) |
| H02G 3/00 | (2006.01) |
| H02J 1/00 | (2006.01) |
| H02J 3/00 | (2006.01) |
| B60M 3/04 | (2006.01) |
| B60L 7/16 | (2006.01) |

(52) U.S. Cl.
CPC .............. B60M 3/04 (2013.01); *B60L 2270/20* (2013.01); *B60L 7/16* (2013.01)
USPC .................. 307/9.1; 307/82; 307/83; 307/84; 191/50

(58) Field of Classification Search
None
See application file for complete search history.

(56) References Cited

U.S. PATENT DOCUMENTS 6,278,256 B1 * 8/2001 Aoyama ........................ 318/801
6,538,412 B1   3/2003 Klose et al.
(Continued)

FOREIGN PATENT DOCUMENTS

DE  197 02 132 C1   7/1998
EP  1 724 147 A2   11/2006
(Continued)

OTHER PUBLICATIONS

Office Action issued Aug. 28, 2012, in Japanese Patent Application No. 2009-061389.
(Continued)

*Primary Examiner* — Jared Fureman
*Assistant Examiner* — Aqeel Bukhari
(74) *Attorney, Agent, or Firm* — Oblon, Spivak, McClelland, Maier & Neustadt, L.L.P.

(57) ABSTRACT

A breaker 162 is opened when a pantograph 101 is lowered. The pantograph 101 is connected to an overhead wire 200. Voltage and its phase of the overhead wire are detected by a detector 161. Power is supplied from a power storage device 150c to a tertiary winding 112c via a power converter 14c such that a primary side of the main transformer 110 has the same voltage and phase as the overhead wire so as to reversely excite the main transformer 110. When the voltage of the main transformer 110 has the same phase as the voltage of the overhead wire 200, the breaker 162 is turned on and then the pantograph 101 is raised, to connect the overhead wire 200 and the main transformer 110 to each other, thereby preventing the occurrence of an excitation inrush current to the main transformer 110.

17 Claims, 6 Drawing Sheets

(56) References Cited

U.S. PATENT DOCUMENTS

| | | | |
|---|---|---|---|
| 8,049,455 B2 * | 11/2011 | Kitanaka | 318/563 |
| 8,269,451 B2 * | 9/2012 | Kitanaka | 318/801 |
| 2008/0036427 A1 * | 2/2008 | Hiraki et al. | 320/166 |

FOREIGN PATENT DOCUMENTS

| | | |
|---|---|---|
| JP | 6-261403 A | 9/1994 |
| JP | 7 117531 | 5/1995 |
| JP | 8 079901 | 3/1996 |
| JP | 2001 352607 | 12/2001 |
| JP | 2002 058110 | 2/2002 |
| JP | 2003 291694 | 10/2003 |
| JP | 2006-320139 A | 11/2006 |
| JP | 2007 043849 | 2/2007 |
| RU | 2166441 C2 | 5/2001 |
| RU | 2183570 C1 | 6/2002 |
| SU | 1749073 A1 | 7/1992 |

OTHER PUBLICATIONS

Decision on Grant issued Dec. 6, 2012 in Russian Patent Application No. 2011141495/11(062038) with English Translation.

International Search Report Issued May 18, 2010 in PCT/JP10/001805 filed Mar. 12, 2010.

* cited by examiner

ROLLING STOCK SYSTEM AND CONTROL METHOD THEREOF

FIELD

Embodiments described herein relate generally to a rolling stock system for preventing an excitation inrush current from flowing into a main transformer when connecting an AC electric rolling stock to an overhead wire.

BACKGROUND

A power failure of 200 to 300 ms long occurs when an AC electric rolling stock crosses a switching section. In the control recently performed, main circuit currents are restricted in the vicinity of the switching section by spot detection. This not only deteriorates the riding comfort but also produces an excitation inrush current flowing to a rolling stock main transformer when switching a feeding circuit. In other words, a main transformer equipped in an AC electric rolling stock produces an excitation inrush current unless applying a voltage to an appropriate phase when receiving a supply of power from an overhead wire. The excitation inrush current not only causes unnecessary operations in feed protection devices but also increases the capacity of earth power-supply equipment.

In the technology described in Japanese Patent Application Publication No. 7-117531A, on the other hand, section switching equipment performs optimum phase angle switching control in order to obtain an optimum closing phase angle of a power supply in the switching section, preventing the occurrence of an excitation inrush current. In Japanese Patent Application Publication No. 2003-291694A, the phase of a middle section of a switching section is controlled by a converter installed in ground equipment in order to switch the middle section to a different power supply feed section.

However, although the technology described in JP7-117531A can prevent the occurrence of an excitation inrush current in the switching section, rolling stock main circuit currents are temporarily restricted when passing through the switching section, deteriorating the riding comfort and causing instant power failure in an auxiliary machine. Moreover, although preventing the occurrence of an excitation inrush current by controlling the closing phase angle by means of the switching section is effective in a feed system using the switching section, it does not serve as a countermeasure in a dead section. For instance, when passing through the dead section or when a rolling stock parked at a storage track attaches a pantograph to an overhead wire to excite a transformer, an excitation inrush current flows into a main transformer.

In JP2003-291694A, on the other hand, placing the converter in the middle section of the switching section results in increasing the size of the equipment.

In the conventional technologies, in case of a power failure of an overhead wire as a result of a power failure of a substation other than when passing through a switching section or dead section, supply of power to various auxiliary machines equipped in a rolling stock is stopped, and there are no countermeasures to such circumstance. Driving the auxiliary machines by means of regenerative energy of the rolling stock at the time of a power failure is considered. In this case, however, the main transformer is reversely excited by the regenerative energy, pressurizing the overhead wire from the pantograph. For this reason, at the time of a power failure of the overhead wire, the pantograph needs to be separated from the overhead wire to perform an operation.

In the case of the dead section other than the switching section system, "overhead dead section indicator" is installed before the dead section, and a driver of the rolling stock is required to visibly confirm this indicator, perform a notch-off operation, and coast through the dead section when passing through the dead section.

SUMMARY

The embodiments described herein was contrived in order to solve such conventional problems described above. In other words, a first object is to provide a rolling stock system capable of preventing the occurrence of an excitation inrush current of a main transformer on a rolling stock side when the rolling stock passes through a switching section/dead section or when attaching a pantograph to an overhead wire as the pantograph rises, and to provide a control method of controlling the rolling stock system. A second object is to provide a rolling stock system capable of supplying power to an auxiliary machine at the time of a power failure of an overhead wire and driving a rolling stock while the overhead wire and a pantograph are in contact with each other, and to provide a control method of controlling the rolling stock system.

In order to accomplish the first object described above, the rolling stock system reversely excites a main transformer by detecting a voltage of an overhead wire. This rolling stock system comprises:

an AC electric rolling stock in which a power collector for obtaining an AC power from an overhead wire is connected to a primary winding of a main transformer equipped in a base rolling stock and in which a secondary winding of the main transformer has connected thereto a circuit that has an AC-DC power converter which performs a regeneration operation for converting an alternate current of the overhead wire to a direct current and returning an energy from a DC side to an AC side, the circuit being a drive power conversion circuit for driving a rolling stock driving motor; and a detector which detects a voltage of the overhead wire, wherein the circuit that has the AC-DC power converter performing the regeneration operation as with the AC-DC power converter of the drive power conversion circuit is selectively connected to a tertiary winding of the main transformer, a power storage device is connected to the AC-DC power converter, and wherein the voltage of the overhead wire is detected by the detector, an energy of the power storage device is applied to the secondary winding or the tertiary winding of the main transformer via the AC-DC power converter, the main transformer is reversely excited such that a primary side of the main transformer has the same phase/same voltage as the detected voltage of the overhead wire, the overhead wire and the primary winding of the main transformer are connected to each other by the power collector and electric power is supplied from the overhead wire to the main transformer through the power collector.

In order to accomplish the second object described above, the rolling stock system supplies power to an auxiliary machine at the time of a power failure of an overhead wire. This rolling stock system comprises an AC electric rolling stock in which a power collector for obtaining an AC power from an overhead wire is connected to a primary winding of a main transformer equipped in a base rolling stock and in which a secondary winding of the main transformer has connected thereto a circuit that has an AC-DC power converter which performs a regeneration operation for converting an alternate current of the overhead wire to a direct current and returning an energy from a DC side to an AC side, the circuit being a drive power conversion circuit for driving a rolling stock driving motor, wherein the AC electric rolling stock has a detector which detects a power failure of the overhead wire, a power storage device is connected to the AC-DC power converter of the drive power conversion circuit, an auxiliary power circuit for supplying power to an auxiliary machine is connected to the power storage device, and, a power failure of the overhead wire is detected by the detector, an energy of the power storage device is supplied to the auxiliary machine via the auxiliary power circuit, to drive the auxiliary machine.

According to the rolling stock system of the embodiments that reversely excites the main transformer by detecting a voltage of the overhead wire, the main transformer is reversely excited using the power storage device provided in the rolling stock, and a voltage of substantially the same phase and degree as the voltage of the overhead wire is applied to the primary side of the main transformer in order to prevent, on the rolling stock side, the occurrence of an excitation inrush current to the main transformer when connecting the main transformer to the overhead wire.

According to the rolling stock system of the embodiments that supplies power to the auxiliary machine at the time of a power failure of the overhead wire, power can be supplied to the auxiliary machine by using the power storage device provided in the rolling stock, while continuously driving the rolling stock, with the overhead wire and the pantograph connected with each other.

DETAILED DESCRIPTION

[Rolling Stock System that Reversely Excites a Main Transformer by Detecting a Voltage of an Overhead Wire]

The followings are a plurality of embodiments of rolling stock systems to which is applied a method of reversely exciting a main transformer by detecting a voltage of an overhead wire.

[First Embodiment]

Figure 1:
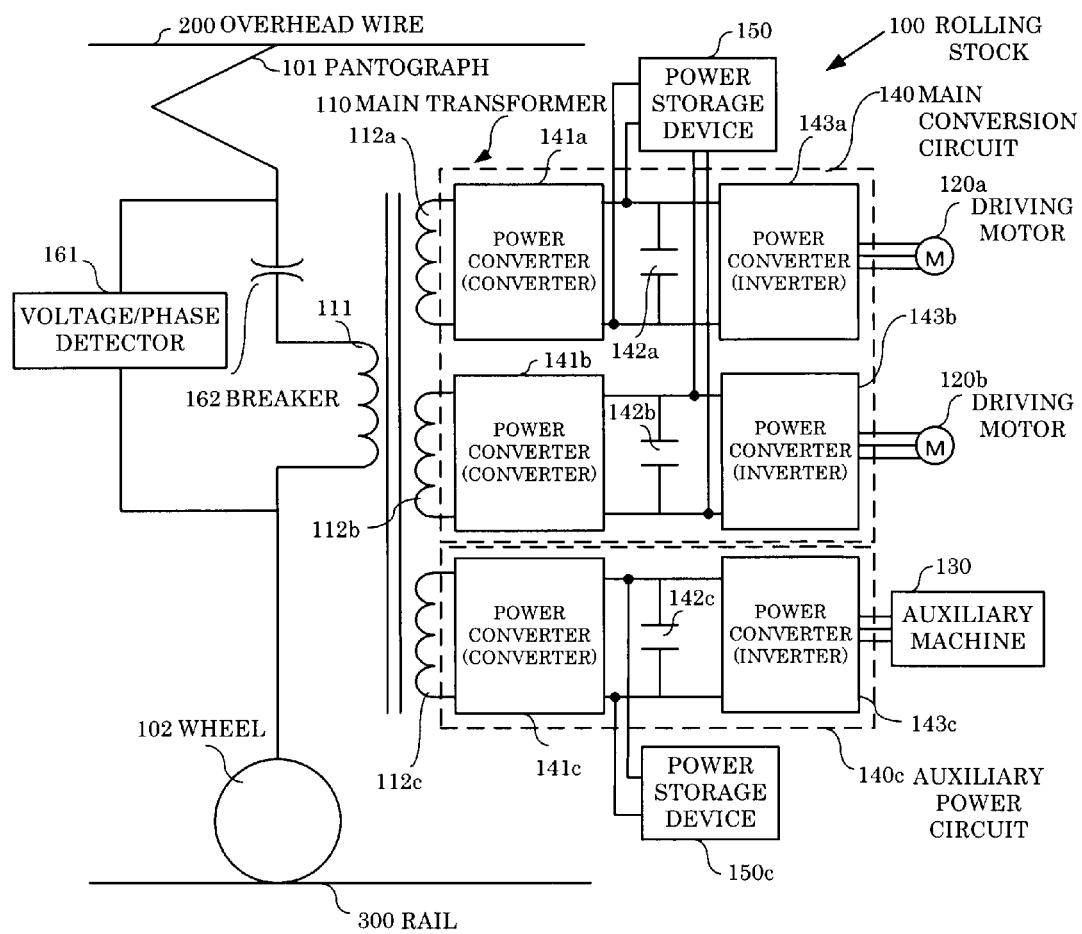
FIG. 1 is a block circuit diagram showing a configuration of a rolling stock system according to a first embodiment.

In a first embodiment shown in FIG. 1, a rolling stock (AC electric rolling stock) 100 has a pantograph (power collector) 101 for obtaining an AC power from an overhead wire 200, and a wheel 102 traveling on a rail 300. The rolling stock 100 is equipped with a main transformer 110, rolling stock driving motors 120a, 120b, and an auxiliary machine 130, and is provided with a main conversion circuit 140 for driving the rolling stock driving motors 120a, 120b.

A primary winding 111 of the main transformer 110 is connected to the pantograph 101. Secondary windings 112a, 112b of the main transformer 110 are connected to the driving motors 120a, 120b, respectively, by the main conversion circuit 140. The main conversion circuit 140 has AC-DC power converters 141a, 141b for converting an alternate current to a direct current, smoothing condensers 142a, 142b connected partially to the DC sides of the AC-DC power converters 141a, 141b, and motor drive power converters (inverters) 143a, 143b for reversely converting the direct current to the alternate current.

In addition to this basic configuration, in the present embodiment the main transformer 110 is provided with a tertiary winding 112c for an auxiliary machine, and an auxiliary power circuit 140c for supplying power to an auxiliary machine 130, wherein the tertiary winding 112c is connected to the auxiliary machine 130 by the auxiliary power circuit 140. Power storage devices 150, 150c are connected to the main conversion circuit 140 and the auxiliary power circuit 140c, respectively. A voltage and phase detector 161 for detecting a voltage and phase of the overhead wire 200 and a breaker 162 are provided between the pantograph 101 and the primary winding 111 of the main transformer 110.

In the present embodiment, PWM converters, which performs an electrical operation for bringing an energy out of the AC power side to the DC side and a regeneration operation for returning the energy from the DC side to the AC power side, are used as the AC-DC power converters 141a, 141b of the main conversion circuit 140 in order to reversely excite the secondary windings 112a, 112b of the main transformer 110. The power storage device 150 on the main conversion circuit 140 side is connected in parallel to a DC section in the middle of the main conversion circuit 140 to store power that is converted into a DC power by the AC-DC power converters 141a, 141b and store regenerative energies of the driving motors 120a, 120b connected to the main conversion circuit 140, as electric power. The power storage device 150 also operates as a power supply for reversely exciting the main transformer 110 by means of the stored power. Note that an independent dedicated battery or an electric double layer capacitor is used as the power storage device 150.

The auxiliary machine 130, on the other hand, may be a computer, air conditioner, light, communication equipment, and various other equipment equipped in the rolling stock and required in running the rolling stock. As with the main conversion circuit 140, the auxiliary power circuit 140c for the auxiliary machine has an AC-DC power converter (PWM converter) 141c for converting an alternate current to a direct current, a smoothing condenser 142c connected to the DC part of the AC-DC power converter 141c, and a power converter (inverter) 143c for an auxiliary machine for converting a direct current to an alternate current. In place of the inverter, a transformer circuit such as a DC-DC converter can be used as the power converter 143c, depending on the type of the auxiliary machine 130. The power storage device 150c on the auxiliary power circuit 140c is connected in parallel to a DC section in the middle of the auxiliary power circuit 140c to store power that is converted into a DC power by the AC-DC power converter 141c. The power storage device 150c also operates as a power supply for reversely exciting the main transformer 110 by means of the stored power. Note that an independent dedicated battery or an electric double layer capacitor is used as the power storage device 150c, as with the power storage device 150 on the main transformer circuit 140 side.

The voltage and phase detector 161 and the breaker 162 are connected in parallel between the pantograph 101 and the primary winding 111 of the main transformer 110. A voltage of the overhead wire can be detected using the voltage and phase detector 161 by opening the breaker 162 without exciting the main transformer 110. As shown in the diagram, the voltage and phase detector 161 is not limited to a detector connected electrically to the overhead 200 so as to directly detect a voltage of the overhead wire and a phase thereof. It may also be used a detector which detects a voltage of the overhead wire and a phase thereof in a non-contact state as with an electrostatic antenna.

Functions of the first embodiment having the configurations described above are as follows. When the parked rolling stock 100 connects the pantograph 101 to the overhead wire 200 and the main transformer 110 to the overhead wire 200, an excitation inrush current is produced depending on a voltage/phase of the overhead wire. In the present embodiment, in order to prevent the occurrence of an excitation inrush current, a voltage of the overhead wire and the phase of the voltage are detected beforehand by the voltage and phase detector 161, and the main transformer 110 is reversely excited by using at least one of the installed AC-DC power converters 141a, 141b and 141c (PWM converters) so that the phase of the voltage on the primary side of the main transformer 110 becomes the same as that of the voltage of the overhead wire.

More specifically, first, the breaker 162 is opened when the pantograph 101 is lowered. Next, the pantograph 101 is connected to the overhead wire 200, and the voltage/phase of the overhead wire is detected by the voltage and phase detector 161. Subsequently, the main transformer 110 is reversely excited such that the primary side of the main transformer 110 has the voltage/phase of the overhead wire detected by the voltage and phase detector 161. For example, the power is supplied from the power storage device 150c to the tertiary winding 112c for an auxiliary machine via the AC-DC power converter (PWM converter) 141c, to reversely excite the main transformer 110 by using this tertiary winding 112c.

In this case, instead of using, as a reversely excitation power supply, the tertiary winding 112c for an auxiliary machine and the AC-DC power converter (PWM converter) 141c and power storage device 150c connected thereto, the main transformer 110 can be reversely excited by supplying the power from the power storage device 150 to the motor drive secondary windings 112a, 112b via the AC-DC power converters (PWM converters) 141a, 141b.

In this manner, the breaker 162 is turned on at the time when the phase of the voltage of the main transformer 110 becomes the same as that of the voltage of the overhead wire 200, and then the pantograph 101 is raised to connect the overhead wire 200 to the main transformer 110. By connecting the main transformer 110 to the overhead wire 200 while the primary side is applied with the phase and voltage same as that of the voltage of the overhead wire, the occurrence of an excitation inrush current in the main transformer 110 can be prevented.

[Second Embodiment]

Figure 2:
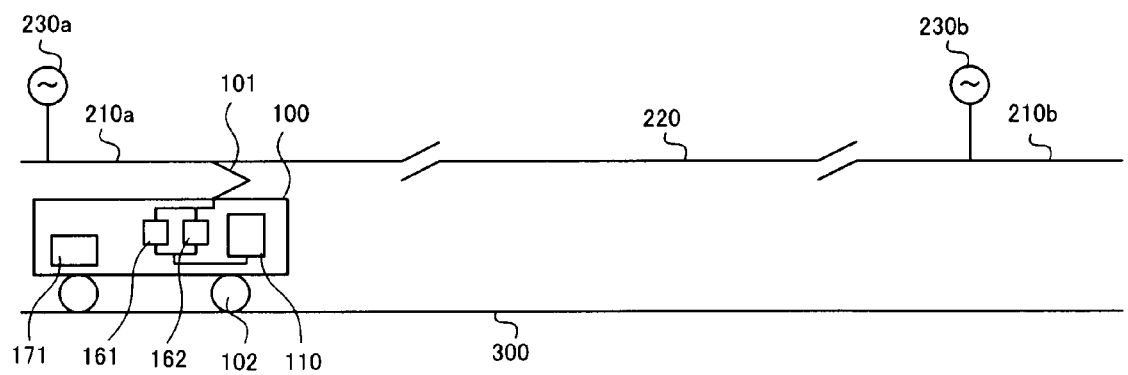
FIG. 2 is a wiring diagram showing a dead section of a rolling stock system according to a second embodiment.

In the first embodiment described above, the pantograph 101 of the parked rolling stock 100 is raised and connected to the overhead wire 200. However, the method of reversely exciting the main transformer by detecting a voltage of the overhead wire can be similarly applied to a case where, as shown in the second embodiment in FIG. 2, a rolling stock on a railway other than bullet train railway passes through a dead section to enter a feed section of a different voltage/phase.

In other words, in this second embodiment, a dead section 220 is provided between overhead wires 210a, 210b of first and second feed sections. The overhead wires 210a, 210b of the first and second feed sections are connected to individual AC systems 230a, 230b, respectively. In addition to the configurations described in the first embodiment, the rolling stock 100 of the second embodiment also has a rolling stock position detecting part 171 that utilizes a GPS or transponder.

In the second embodiment, the entry of the rolling stock 100 into a power failure section of the dead section 220 is detected by the rolling stock position detecting part 171 or based on a change in the voltage of the overhead wire that is detected by the voltage and phase detector 161, to open the breaker 162. Subsequently, the voltage of the overhead wire is detected by the voltage and phase detector 161 after the rolling stock 100 passes through the dead section 220, to detect a voltage phase and the amount of the voltage of the overhead wire.

The main transformer 110 is reversely excited by using the AC-DC power converter 141a, 141b or 141c connected to the secondary winding 112a, 112b or third winding 112c of the main transformer 110 of the rolling stock 100 and the power storage device 150 or 150c connected to the AC-DC power converter 141a, 141b or 141c, so as to obtain a voltage value indicating the same phase and voltage as those of the detected voltage. Thereafter, the breaker 162 is turned on when the phase of the voltage on the primary side of the main transformer 110 becomes the same phase as the voltage of the overhead wire.

As described above, in the second embodiment the voltage phase of a subsequent feed section and the position of the rolling stock are detected during the passage of the rolling stock through the dead section 22, and the main transformer 110 is excited beforehand in accordance with the voltage phase of the subsequent feed section, whereby an excitation inrush current is prevented from occurring at the time of the entry of the rolling stock into an adjacent feed section.

In addition, under present circumstances, a driver person is required to perform a notch-off operation when the rolling stock passes through the dead section, as described above. According to the present embodiment, the notch-off operation can be automated by opening the breaker 162 in the manner described above, reducing the burden on the driver. The rolling stock can pass in a power running/regenerated state through the dead section 220, as long as the output capacity of the auxiliary power circuit 140c connected to the tertiary winding 112c of the main transformer 110 and the capacity of the power storage device 150c correspond to input and output power/energy required when the rolling stock passes through the power failure section of the dead section 220.

[Third Embodiment]

Figure 3:
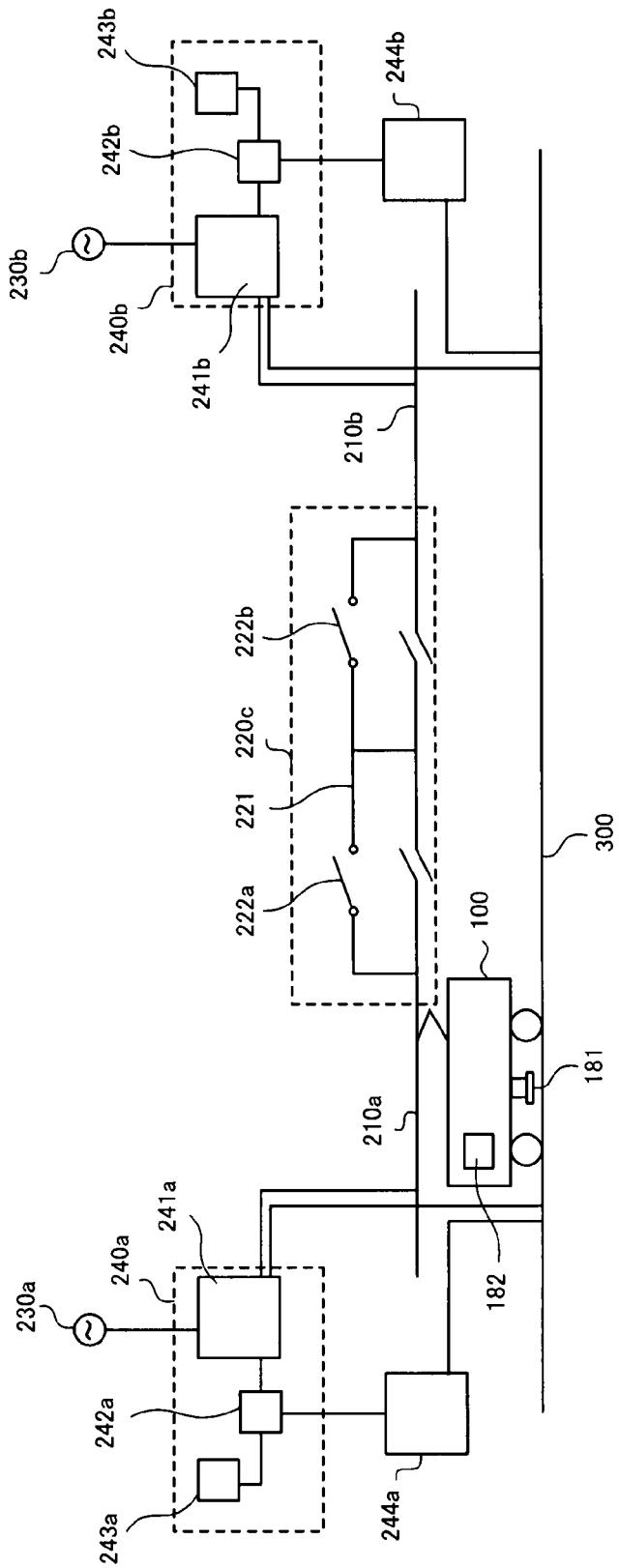
FIG. 3 is a wiring diagram showing a switching section of a rolling stock system according to a third embodiment.

FIG. 3 is now used for describing a third embodiment in which the method of reversely exciting the main transformer by detecting the voltage of the overhead wire is applied to a rolling stock system used in a bullet train having a switching section. In FIG. 3, the connection section between the overhead wires 210a, 210b of the first and second feed sections is provided with a switching section 220c. The switching section 220c is configured by a middle section 221 and changeover switches 222a, 222b for connecting or separating the middle section 221 to or from the overhead wires 210a, 210b of the first and second feed sections. In addition to the configurations described in the first embodiment, the rolling stock 100 of the third embodiment also has a signal receiver 181 and a time measuring part 182 using a GPS or the like.

The overhead wires 210a, 210b of the first and second feed sections are supplied with power from substations 240a, 240b that are connected, respectively, to the AC systems 230a, 230b of different voltages. The substations 240a, 240b are provided respectively with transducing parts 241a, 241b for converting power received from the AC systems 230a, 230b into feed power, time and feed-voltage-phase detecting parts 242a, 242b for detecting a voltage and phase of the power supplied by the transducing parts 241a, 241b to the overhead wires 210a, 210b, and time measuring parts 243a, 243b for measuring the time at which the phase is observed.

Information transmitters 244a, 244b are connected to the time and feed-voltage-phase detecting parts 242a, 242b of the substations 240a, 240b. The information transmitters 244a, 244b of ground equipment transmit time-voltage phase information to the signal receiver 181 provided in the rolling stock 100. The signal receiver 181 on the rolling stock 100 side receives the time-voltage phase information from the time and feed-voltage-phase detecting parts 242a, 242b, and accurately measures the current time using the time measuring part 182 such as an equipped GPS.

Functions of the third embodiment having such configurations are now described.

Currently in the rolling stock system used in a bullet train, which as a switching section, the rolling stock passes through the switching section 220c shown in FIG. 3, when entering a different feed section (e.g., when the rolling stock enters the second feed section from the first feed section, in FIG. 3). When the rolling stock 100 that receives power from the overhead wire 210a of the first feed section enters the switching section 220c, the changeover switch 222a on the first feed section side of the switching section 220c is closed. In this state, a voltage that is supplied from the substation 240a to the overhead wire 210a of the first feed section is applied to the middle section 221. Subsequently to this state, the changeover switch 222a on the first feed section side of the switching section 220c is opened after the rolling stock 100 completely enters the middle section 221.

Consequently, supply of power from the substation 240a to the middle section 221 is stopped, which causes a power failure. In this state, when, for example, the changeover switch 222b on the second feed section side is closed after a power failure of 300 ms long after a lapse of a certain time period, a voltage that is supplied from the substation 240b to the overhead wire 210b of the second feed section is applied to the middle section 221. A large excitation inrush current is produced depending on the voltage phase applied to the transformer at this moment. In the present embodiment, in order to prevent the occurrence of such an excitation inrush current, the main transformer 110 is reversely excited using the AC-DC power converters (PWM converters) 141a, 141b of the rolling stock when a power failure occurs in the middle section 221, and then the voltage phase on the primary side of the main transformer 110 is controlled such that it changes from the voltage phase supplied to the overhead wire 210a of the first feed section, to the phase same as that of the overhead wire 210b of the second feed section. As a result, the primary side of the main transformer 110 of the rolling stock is excited at a voltage of the phase same as that of the second feed section, when the changeover switch 222b on the second feed section side is turned on and consequently the power supply to the middle section 221 recovers. Consequently, the occurrence of an inrush current to the main transformer 110 is prevented.

In order to excite the main transformer 110 to obtain the same phase as that of the second feed section, a source of energy for the excitation and the voltage phase information of the second feed section are required. The power storage device 150 connected to the DC sides of the AC-DC power converters (PWM converters) 141a, 141b, or a method for forcibly applying a regenerative brake to the rolling stock to supply the energy, can be used as the source of energy, as described in the first embodiment. When the energy is low, the energy can be supplied from the smoothing capacitors 142a, 142b provided on the DC sides of the AC-DC power converters (PWM converters) 141a, 141b. Moreover, as with the first embodiment, the tertiary winding 112c can be excited by the power storage device 150c and the AC-DC power converter 141c that are provided in the auxiliary power circuit 140c.

The voltage phase information can be acquired by using an ATC, a ground unit laid on a rail track, inductive radio or space radio using a leaky wave coaxial cable, or various other communication devices for allowing information communication between the ground and a train. More specifically, as shown in FIG. 3, the information transmitters 244a, 244b on the ground equipment side and the signal receiver 181 on the rolling stock 100 side are used. With these communication devices, the voltage phase that is observed in the substation 230b supplying power to the overhead wire 210b of the second feed section that the rolling stock 100 enters, and the time at which the voltage phase is observed, are transmitted to the rolling stock 100. The rolling stock 100 estimates the voltage phase of the overhead wire 210b of the second feed section that is obtained at the current time, by means of the time measuring part 182 for measuring an accurate current time, and based on the transmitted information on the time-voltage phase of the voltage of the voltage of the overhead wire. As a result, the main transformer 110 can be excited such that the phase of the voltage on the primary side thereof becomes same as the estimated voltage phase of the overhead wire 210b of the second feed section.

The third embodiment has the effect of reversely exciting the main transformer without providing a voltage and phase detection device or a breaker in the rolling stock, as well as preventing the application of an excitation inrush current to the main transformer when the rolling stock enters the next feed section.

[Other Embodiments]

The above-described method for reversely exciting the main transformer by detecting the voltage of the overhead wire is not limited to the embodiments described above and includes the following embodiments.

(a) Instead of using independent dedicated batteries or electric double layer capacitors as the power storage devices 150, 150c, the smoothing capacitors 142a, 142b, 142c provided in the main conversion circuit 140 or the auxiliary power circuit 140c are used as the power storage devices, when the smoothing capacitors 142a, 142b, 142c have large capacities.

(b) When there exists the power failure section such as the middle section of the switching section, the supply of power from the overhead wire sides to the main transformer can be stopped without using the breaker 162. Therefore, the main transformer can be reversely excited during that time so that the voltage and its phase match the voltage and its phase of the next feed section.

(c) In place of the energy from the power storage device, an excitation energy of the transformer is supplied from an electric motor and a power converter driving the electric motor, by using the position detecting part of the rolling stock to detect the passage of the rolling stock through the dead section and by using the regenerative brake during the passage of the rolling stock through the dead section. As a result, the power storage device can be reduced in size or eliminated.

[Rolling Stock System for Supplying Power to Auxiliary Machine During Power Failure of Overhead Wire]

Next are described a plurality of embodiments of a rolling stock system to which is applied a method for supplying power to an auxiliary machine during a power failure of an overhead wire.

[Fourth Embodiment]
[Configurations of the Fourth Embodiment]

Figure 4:
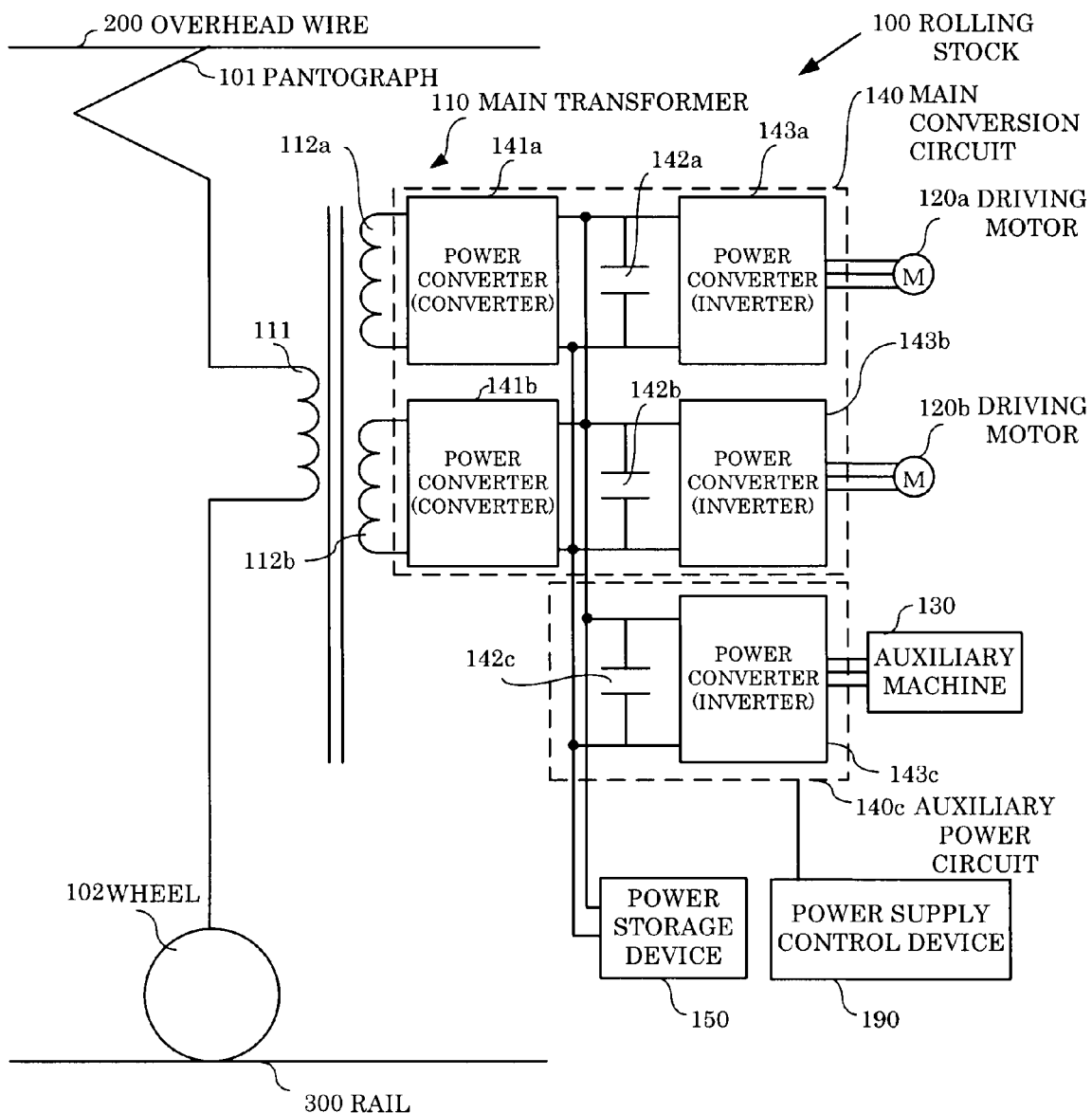
FIG. 4 is a block circuit diagram showing a configuration of a rolling stock system according to a fourth embodiment.

The fourth embodiment shown in FIG. 4 is same as the first embodiment in the basic configuration of the rolling stock (AC electric rolling stock) 100, which is provided with the main transformer 110, the rolling stock driving motors 120a, 120b, the auxiliary machine 130, and the main conversion circuit 140 for driving the rolling stock driving motors 120a, 120b.

The present embodiment is also same as the first embodiment in that the PWM converters which performs the electrical operation for bringing an energy out of the AC power side to the DC side and the regeneration operation for returning the energy from the DC side to the AC power side, as the AC-DC power converters 141a, 141b of the main conversion circuit 140, in order to reversely excite the secondary windings 112a, 112b of the main transformer 110.

However, the auxiliary power circuit 140c and its peripheral circuit configurations of the present embodiment are different from those of the first embodiment. Also, unlike the first embodiment, the present embodiment has a power supply control device 190. The differences between the present embodiment and the first embodiment are described hereinafter.

In other words, as with the first embodiment, the present embodiment has the auxiliary power circuit 140c for supplying power to the auxiliary machine 130, but the configuration of the auxiliary power circuit 140c is different from that of the first embodiment. In the present embodiment, the auxiliary power circuit 140c is configured by the smoothing capacitor 142c and the power converter (inverter) 143c for an auxiliary machine without using the AC-DC power converter 141c. It should be noted that, as with the first embodiment, a conversion circuit such as a DC-DC converter can be used as the power converter 143c, in place of the inverter, depending on the type of the auxiliary machine 130.

As described above, the auxiliary machine 130, on the other hand, may be a computer, air conditioner, light, communication equipment, and various other equipment equipped in the rolling stock and required in running the rolling stock. In the present embodiment, the auxiliary machine 130 further includes an induction motor connected as an auxiliary electric motor, wherein a regenerative energy of the induction motor is supplied to the DC part of the auxiliary power circuit 140c when the rolling stock 100 performs the regeneration operation.

Moreover, in the present embodiment, only one power storage device 150 is provided as the power storage device, which is connected in parallel to the DC part in the middle of the main conversion circuit 140 and to the DC part of the auxiliary power circuit 140c. This power storage device 150 stores the power that is converted into a DC power by the AC-DC power converters 141a, 141b and also stores, as power, regenerative energies of the driving motors 120a, 120b connected to the main conversion circuit 140 and the regenerative energy of the induction motor included as one of the auxiliary machines 130. The power storage device 150 is operated as a power supply that reversely excites the main transformer 110 by means of the stored power, and as a power supply for supplying power to the auxiliary machine.

As with the first embodiment, the present embodiment can use an independent dedicated battery or an electric double layer capacitor as the power storage device, or, instead, the smoothing capacitor provided in the main conversion circuit 140 or the auxiliary power circuit 140c can be used as the power storage device when the smoothing capacitor has a large capacity.

The power supply control device 190 provided in the present embodiment performs an operation for reversely exciting the secondary windings 112a, 112b of the main transformer 110 or a control operation for supplying power to the auxiliary machine 130, by means of the energy stored in the power storage device 150.

Figure 5:
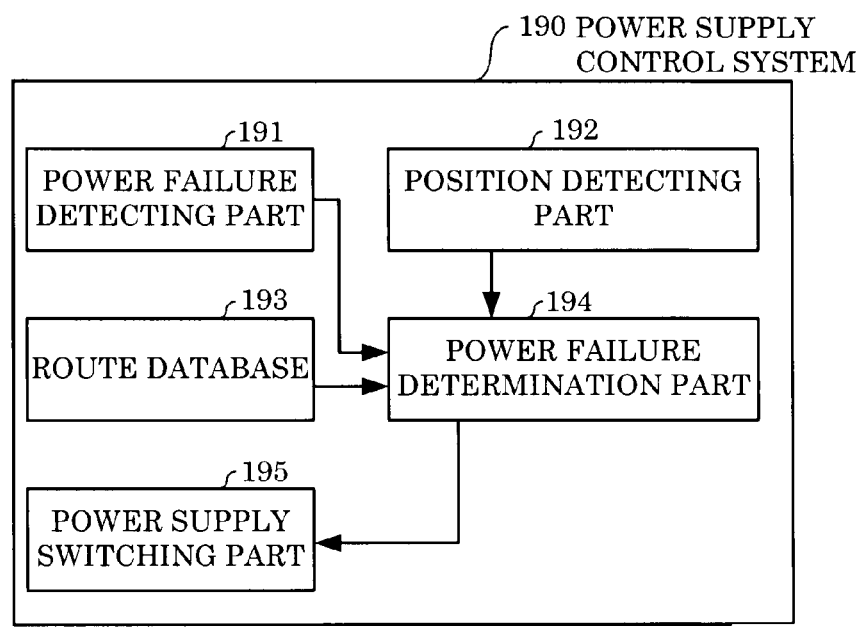
FIG. 5 is a block diagram showing a configuration of a power supply control device according to the fourth embodiment.

In other words, as shown in FIG. 5, the power supply control device 190 has a power failure detecting part 191 that detects a power failure of the overhead wire 200 by collecting power from the pantograph 101, a position detecting part 192 that detects the current position of the rolling stock by using a GPS or transponder, and a route database 193 that has stored therein route information including information on the dead section such as the switching section.

The power supply control device 190 also has a power failure determination part 194. When a power failure of the overhead wire is detected by the power failure detecting part 191, the power failure determination part 194 determines whether the current position of the rolling stock is on the dead section or not, based on the current position of the rolling stock detected by the position detecting part 192 and the position information on the dead section stored in the route database 193. By determining whether the current position of the rolling stock is on the dead section or not, the power failure determination part 194 determines whether the detected "power failure of the overhead wire" is due to the dead section such as the switching section or as a result of stopping the supply of power from the substations.

The power supply control device 190 also has a power supply switching part 195 that supplies the power stored in the power storage device 150, to the auxiliary machine 130, in response to the result of the determination made by the power failure determination part 194.

[Functions and Effects of the Fourth Embodiment]

The functions and effects of the fourth embodiment having the configurations described above are as follows.

(1) Detecting a power failure

Figure 6:
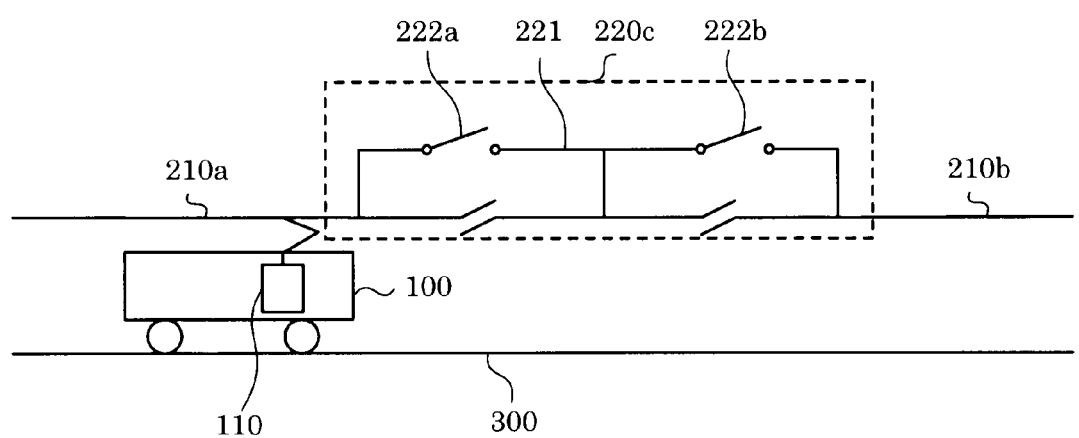
FIG. 6 is a wiring diagram showing a switching section of the rolling stock system according to the fourth embodiment.

Currently in the rolling stock system used in a bullet train, which has a switching section, the rolling stock passes through the switching section 220c shown in FIG. 6, when entering a different feed section (e.g., when the rolling stock enters the second feed section from the first feed section, in FIG. 6). When the rolling stock 100 that receives power from the overhead wire 210a of the first feed section enters the switching section 220c, the changeover switch 222a on the first feed section side of the switching section 220c is closed. In this state, a voltage that is supplied to the overhead wire 210a of the first feed section, is applied to the middle section 221. Subsequently to this state, the changeover switch 222a on the first feed section side of the switching section 220c is opened after the rolling stock 100 completely enters the middle section 221.

Consequently, the power on the first feed section side is no longer supplied to the middle section 221, whereby the rolling stock 100 enters a power failure state and runs with the regenerative energy, and the supply of power to the driving motors 120a, 120b and the auxiliary machine 130 is stopped. In this case, the power failure determination part 194 refers to the route database 193 by using power supply disruption information from the overhead wire 210a that is detected by the power failure detecting part 191, as well as the current position of the rolling stock acquired from the position detecting part 192, and determines whether the current position of the rolling stock is on the switching section or not. Accordingly, the power failure determination part 194 determines whether the disrupted power supply from the overhead wire is due to the switching section 220c or power supply disruption caused by an accident in the substations or the like.

(2) Preventing the occurrence of excitation inrush current (switching section)

When the power failure determination part 194 determines that the disrupted power supply from the overhead wire is due to the switching section 220c, the occurrence of an excitation inrush current to the main transformer 110 is prevented. In other words, when the rolling stock 100 enters the middle section 221 of the switching section 220c and the changeover switch 222a on the first feed section side is opened, the changeover switch 222b on the second feed section side is closed after a certain period of time such as 300 ms. Consequently, the voltage that is supplied to the overhead wire 210b of the second feed section is applied to the middle section 221. A large excitation inrush current is produced depending on the phase of the voltage applied to the main transformer 110.

In the present embodiment, in order to prevent the occurrence of such an excitation inrush current, the main transformer 110 is reversely excited by using the AC-DC power converters (PWM converters) 141a, 141b of the rolling stock when the supply of power is stopped at the middle section 221, and the voltage phase on the primary side of the main transformer 110 is controlled such that it is changed from the phase of the voltage supplied to the overhead wire 210a of the first feed section, to the phase same as that of the overhead wire 210b of the second feed section. For example, the power is supplied from the power storage device 150 to the secondary windings 112a, 112b of the main transformer 110 via the AC-DC power converters (PWM converters) 141a, 141b by using the power supply switching part 195 of the power supply control device 190, and the main transformer 110 is reversely excited by using the secondary windings 112a, 112b. As a result, the primary side of the main transformer 110 of the rolling stock is excited at a voltage of the phase same as that of the second feed section, when the changeover switch 222b on the second feed section side is turned on and consequently the power supply to the middle section 221 recovers. Consequently, the occurrence of an inrush current to the main transformer 110 is prevented.

In order to excite the main transformer 110 to obtain the same phase as that of the second feed section, the source of energy for the excitation and the voltage phase information of the second feed section are required. The power storage device 150 connected to the DC sides of the AC-DC power converters (PWM converters) 141a, 141b, or the method for forcibly applying the regenerative brake to the rolling stock to supply the energy, is used as the source of energy, as described above. When the energy is low, the energy can be supplied from the smoothing capacitors 142a to 142c provided on the DC sides of the AC-DC power converters (PWM converters) 141a, 141b.

It is considered that the voltage phase information can be acquired by recording the voltage phase information of each feed section in the route database 193 and causing the power failure determination part 194 to refer to the recorded voltage phase information, or by using an ATC, a ground unit laid on a rail track, inductive radio or space radio using a leaky wave coaxial cable, or various other communication devices for allowing information communication between the ground and a train. As with the third embodiment described above, the communication device can be configured by providing a transmitter that transmits, to the rolling stock, the voltage of the overhead wire measured by the ground equipment for supplying power to the overhead wire in order to detect the voltage of the overhead wire, and providing the rolling stock with a receiver for receiving a signal from this transmitter. The main transformer 110 can be excited based on the voltage phase information acquired as described above, so as to obtain the phase same as the voltage phase of the overhead wire 210b of the second feed section.

The fourth embodiment has the effect of reversely exciting the main transformer without providing the voltage and phase detection device or breaker in the rolling stock, as well as preventing the application of an excitation inrush current to the main transformer when the rolling stock enters the next feed section.

(3) Driving the auxiliary machine by means of the power storage device (during a power failure of the substations)

When the power failure determination part 194 determines that the disrupted power supply from the overhead wire is due to a power failure of the substations, the power supply switching part 195 of the power supply control device 190 supplies the power of the power storage device 150 to the auxiliary machine 130. In this manner, a power failure of the auxiliary machine 130 is prevented. Moreover, disruption of the operations of the light, the computer and the various other auxiliary machines equipped in the rolling stock 100 and required in running the rolling stock, can be prevented. In this case, because the power can be supplied from the power storage device 150 to the auxiliary machine 130 without exciting the main transformer 110, the power can be supplied to the auxiliary machine 130 without applying pressure to the overhead wire 200 even when the pantograph 101 is connected to the overhead wire 200. This can contribute to the improvement of the safety of a feeding circuit at the time of a power failure of the overhead wire.

The power storage device 150 absorbs the regenerative power with which the rolling stock runs, and emits the energy stored when a power run peak is generated, thereby preventing the occurrence of peak power of the rolling stock. This can contribute to reduction of the capacity of ground substation equipment. In addition, even when a power failure occurs in the overhead wire, the rolling stock can be allowed to run without the overhead wire, by supplying the power from the power storage device 150 to the main conversion circuit 140 and driving the driving motors 120a, 120b.

[Fifth Embodiment]

Figure 7:
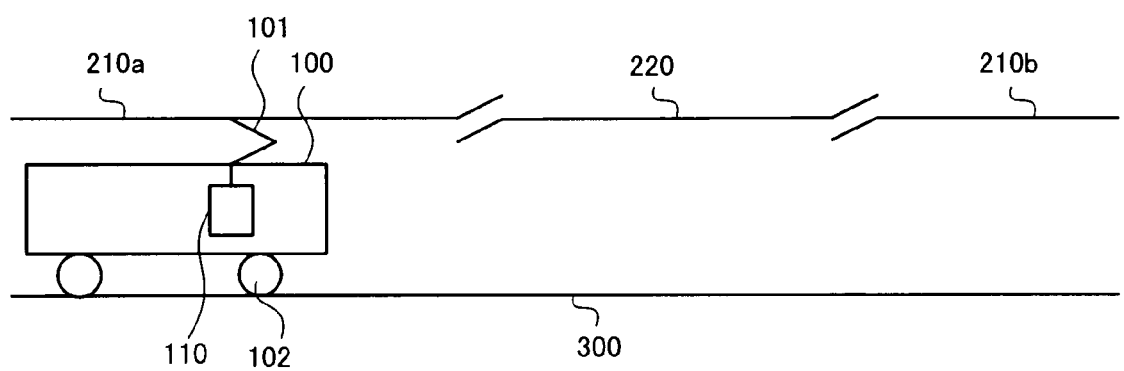
FIG. 7 is a wiring diagram showing a dead section of a rolling stock system according to a fifth embodiment.

As described above, the rolling stock system of the fourth embodiment determines the presence of a power failure and reversely excites the main transformer when a rolling stock passes through the switching section. This can be applied not only to the bullet train passing through the switching section but also to the other ordinary trains passes through the dead section other than the switching section so that a rolling stock on an existing railway enters the feed section of a different voltage phase, as in a fifth embodiment shown in FIG. 7.

In other words, in this fifth embodiment, the dead section 220 other than the switching section is provided between the overhead wires 210a, 210b of the first and second feed sections. The configuration of the rolling stock 100 according to the fifth embodiment is same as that of the fourth embodiment, and, in the same manner as the fourth embodiment, the power is supplied to the auxiliary machine when the presence of a power failure is determined or a power failure occurs in the overhead wire. In the present embodiment in which the rolling stock passes through the dead section 220 other than the switching section, the entry of the rolling stock 100 into the power failure section of the dead section 220 is detected by the power failure determination part 194, and the voltage phase of the second feed section and the amount of voltage of the overhead wire are acquired by referring to the route database 193 or by means of the information communication of the communication device.

The main transformer 110 is reversely excited using the AC-DC power converters 141a, 141b connected to the secondary windings 112a, 112b of the main transformer 110 on the rolling stock 100 side and the power storage device 150 connected to the AC-DC power converters 141a, 141b, so as to obtain the same phase and the same level of voltage as the acquired voltage. Subsequently, the rolling stock exits the dead section 220 while the voltage on the primary side of the main transformer 110 has the same phase as the voltage of the overhead wire and receives the power from the overhead wire 210b of the second feed section. In this manner, in the fifth embodiment, the voltage phase of the subsequent feed section and the position of the rolling stock are acquired during the passage of the rolling stock through the dead section 220, and the main transformer 110 is excited beforehand in accordance with the voltage phase of the subsequent feed section, thereby preventing the an excitation inrush current from occurring when the entry of the rolling stock enters an adjacent feed section.

As described above, under present circumstances, the driver is required to perform the notch-off operation when the rolling stock passes through the dead section. According to the present embodiment, the notch-off operation can be automated by automatically detecting the entry of the rolling stock into the dead section, reducing the burden on the driver. In addition, the rolling stock can pass in a power running/regenerated state through the dead section 220, as long as the output capacity of the auxiliary power circuit 140c and the capacity of the power storage device 150 correspond to the input and output power/energy required when the rolling stock passes through the power failure section of the dead section 220.

The invention claimed is:

1. A rolling stock system, comprising:
a power collector, connected to a primary winding of a transformer, which collects a first AC power from an overhead wire,
a first power conversion unit, connected to a secondary winding of the transformer, which, based on the first AC power, generates a second AC power for driving a motor,
a second power conversion unit, connected to a tertiary winding of the transformer, which, based on the first AC power, generates a third AC power to be supplied to an auxiliary device,
a detector which detects a voltage of the overhead wire; and
a power storage connected to at least one of the first power conversion unit and the second power conversion unit;
wherein, after no power is detected, the first AC power is collected by the power collector when a phase and voltage level of the first AC power detected by the detector is synchronized with a phase and voltage level of a power supplied to the transformer, via the first power conversion unit or the second power conversion unit, from the power storage.

2. The rolling stock system according to claim 1, further comprising:
a breaker connected in parallel to the detector, which electrically connects and disconnects the overhead wire to and from the transformer,
wherein, collecting of the first AC power via the power collector from the overhead wire by closing the breaker is initiated when the phase and voltage level of the first AC power detected by the detector is synchronized with the phase and voltage level of the power supplied to the transformer, via the first power conversion unit or the second power conversion unit, from the power storage.

3. The rolling stock system according to claim 2, wherein the collecting of the first AC power via the power collector from the overhead wire by closing the breaker is initiated when entering into a feed section from a dead section and the phase and voltage level of the first AC power detected by the detector is synchronized with the phase and voltage level of the power supplied to the transformer, via the first power conversion unit or the second power conversion unit, from the power storage.

4. The rolling stock system according to claim 3, wherein the power is supplied to the transformer based on a regeneration power generated by the motor, via the first power conversion unit, while being in the dead section.

5. The rolling stock system according to claim 1, further comprising:
a receiver which receives information including the phase and voltage level of the first AC power flowing the overhead wire from a ground equipment which supplies the first AC power to the overhead wire.

6. The rolling stock system according to claim 1, further comprising:
a time measuring unit which generates current time;
wherein the information further includes time which indicates detection timing of the phase and voltage level of the first AC power, and the phase and voltage level of the first AC power is estimated based on the time included in the information and the current time.

7. The rolling stock system according to claim 1, wherein the first power conversion unit has an AC-DC converter and an inverter for converting a DC power generated by the AC-DC converter into an AC power, and
the power storage is connected between the AC-DC converter and the inverter.

8. The rolling stock system according to claim 1, wherein the second power conversion unit has an AC-DC converter and an inverter for converting a DC power generated by the AC-DC converter into an AC power, and
the power storage is connected between the AC-DC converter and the inverter.

9. The rolling stock system according to claim 1, wherein the power storage is a smoothing capacitor.

10. A rolling stock system, comprising:
a power collector, connected to a primary winding of a transformer, which collects a first AC power from an overhead wire,
a power conversion unit, connected to a secondary winding of the transformer, which, based on the first AC power, generates a second AC power for driving a motor,
a power storage connected to the power conversion unit;
an auxiliary power circuit, connected to the power storage, which supplies power to an auxiliary device; and
a power control device which supplies a power stored in the power storage to the auxiliary device, via the auxiliary power circuit, to drive the auxiliary device, when a power failure of the overhead wire is detected,
wherein the power control device includes:
a power failure detecting part which detects that no power is supplied from the overhead wire;
a position detecting part which detects a current position of the rolling stock;

a route database that stores route information including position information concerning a dead section;

a power failure determination part which, when the power failure detector detects no power, determines whether the current position of the rolling stock is on the dead section or not, based on the current position of the rolling stock detected by the position detecting part and the position information concerning the dead section stored in the route database; and a power supply switching part which supplies the power stored in the power storage device to the auxiliary device in response to a result of the determination by the power failure determination part.

11. The rolling stock system according to claim 10, wherein, the route database further stores a phase and voltage level regarding each feed section, the power failure determination part obtains the phase and voltage level stored in the route database, and the power supply switching part supplies, via the power conversion unit, the power stored in the power storage to the transformer when output power from the power conversion unit is synchronized with the phase and voltage level obtained by the power failure determination part, so that the output power from the power conversion unit is supplied when entering into a feed section.

12. The rolling stock system according to claim 11, wherein the at least one of the power from the power conversion unit based on the regeneration power generated by the motor and the power from the auxiliary device is supplied to the transformer, via the power conversion unit, while being in the dead section.

13. The rolling stock system according to claim 11, further comprising:

a receiver which receives information including the phase and voltage level of the first AC power flowing the overhead wire from a ground equipment.

14. The rolling stock system according to claim 10, wherein the power conversion unit has an AC-DC converter and an inverter for converting a DC power generated by the AC-DC converter into an AC power, and the power storage is connected between the AC-DC converter and the inverter.

15. The rolling stock system according to claim 10, wherein the power storage is a smoothing capacitor.

16. A control method for a rolling stock system, comprising:

collecting, by a power collector connected to a primary winding, a first AC power from an overhead wire, generating, by a first power conversion unit connected to a secondary winding of the transformer, second AC power based on the first AC power for driving a motor, generating, by a second power conversion unit connected to a tertiary winding of the transformer, a third AC power based on the first AC power to be supplied to an auxiliary device, detecting a voltage of the overhead wire; and collecting the first AC power from the overhead wire when the detected phase and voltage level of the first AC power is synchronized with a phase and voltage level of a power supplied to the transformer, via the first power conversion unit or the second power conversion unit, from a power storage.

17. A control method for a rolling stock system, comprising:

collecting, by a power collector connected to a primary winding of a transformer, a first AC power from an overhead wire, generating, by a power conversion unit connected to a secondary winding of the transformer, a second AC power based on the first AC power for driving a motor, supplying, by an auxiliary power circuit connected to a power storage, power to an auxiliary device, detecting no power of the overhead wire based on the first AC power collected a by the power collector, detecting a current position of the rolling stock, and determining, when no power is detected, whether the current position of the rolling stock is on the dead section or not, based on the detected current position of the rolling stock and position information concerning the dead section stored in a route database; and supplying the power stored in a power storage device to the auxiliary device in response to a result of the determination.

* * * * *